Fig. 3-A

INVENTORS
WAYNE M. ROSS
JOHN W. DUDLEY

ATTORNEYS

March 14, 1967 W. M. ROSS ET AL 3,309,650
PULSE-ECHO SOUNDER SYSTEM
Filed Sept. 24, 1963 3 Sheets-Sheet 3

INVENTORS
WAYNE M. ROSS
JOHN W. DUDLEY
BY
Reynolds & Christensen
ATTORNEYS

United States Patent Office 3,309,650
Patented Mar. 14, 1967

3,309,650
PULSE-ECHO SOUNDER SYSTEM
Wayne M. Ross and John W. Dudley, Seattle, Wash., assignors to Ross Laboratories, Inc., Seattle, Wash., a corporation of Washington
Filed Sept. 24, 1963, Ser. No. 311,044
11 Claims. (Cl. 340—3)

This invention relates to improvements in pulse-echo detection systems and more specifically concerns improved underwater sounders for accurately locating and depicting on a recording medium bottom surfaces, overlying schools of fish and other objects, all in such manner that they can be distinguished and identified. The invention is herein illustratively described by reference to the presently preferred embodiment thereof; however, it will be recognized that certain modifications and changes therein with respect to details may be made without departing from the essential features involved.

The improvements of this invention are particularly applicable in conjunction with recorders of the type in which an electrically energizable point stylus is scanned repeatedly across electrically sensitive recording paper moved progressively at right angles to the direction of stylus scan. Conventionally, detected echo signals from a sonar receiver applied to the moving stylus create electrical discharges through the paper and thereby produce marks at relative locations along the recording scale corresponding to the target ranges. In the usual practice amplified echo signals applied to the stylus from distinct reflective objects (i.e. those of interest) are unmodified in amplitude, and, while they may be compressed or shortened, they are either of sufficient amplitude to produce a mark of full intensity or none at all, despite the available dynamic range of the paper. Unless marked by a signal, the chart paper being traversed by the stylus remains essentially white or its natural light color. Noise and random signals of lesser intensity than the echoes of principal interest may produce shades or tones of marking intensity but this occurs in purely random manner and it is not within the scope of amplitude adjustments in the system to regulate or modify these except as may be incidental to adjustments made for achieving desired signal intensity.

A problem with such systems and with certain systems which compress the desired signals, with or without blanking thereafter, is the difficulty of interpreting the display in order to differentiate between marks from bottom signals and from schools of fish lying at or immediately adjacent the bottom. In some cases there is no basis for such differentiation in the recorder display. The records produced by prior systems are also wanting in the extent of useful information presented in the display. For example, in one prior effort to provide greater resolution between desired signal traces weak signals were traced on the chart paper without modification, and the desired strong signals, such as those from large schools of fish or from the bottom itself were self-compressed and self-blanked thereafter for a predetermined time. Thus, the moving stylus subjected to the resultant marking pulse first produced a heavy dark trace followed by a blank or white zone, and thereafter by a dark trace. A succession of these sequential traces occurring across the chart paper produced a blank zone between heavy dark zones one of which represented the bottom contour and the second of which represented the fade-out of the train of bottom echoes caused by transmitted beam divergence. If the gain level was set too high, which could easily be the case because of the variable conditions encountered in fishing, the presence of a large concentration of fish at or near the bottom would go undetected because it appeared on the recorder as merely a slight change of bottom contour. This was due to the on-off amplitude characteristic of the blanking function. It was also partly due to fluctuations in response time of the blanking circuit from cycle to cycle, falsely creating the appearance of a jagged bottom. Further, complete blanking of stylus voltage in order to produce the blank zone effect caused the unrealistic pictorial impression of a detached layer floating over the bottom instead of being part of it, tending to impair ready interpretation of the record.

In accordance with an important aim of this invention image traces of fish or other objects at any depth are clearly produced and particularly are defined sharply in relation to the image traces defining the bottom itself so as to permit relatively clear identification of separate objects at the bottom and just off the bottom. Moreover, the bottom image itself is presented in such a manner as to be sharply defined as to location and yet to be represented in a pictorially realistic manner conducive to ready interpretation. Further, the echo signals applied as marking signals to the recording indicator are so modified that useful information concerning the nature of the bottom (i.e. hard or soft) as well as its contour, and as to the size and extent of a fish school are more readily determined than heretofore.

A further object is to achieve these results in a reliable, efficient and versatile manner and with means enabling the operator to make suitable adjustments which enhance the effects described or reduce those effects in accordance with needs or desires on particluar occasions. Equally, if not more important, it is an object to devise a system which is not critical to adjust but which has inherent tolerance or dynamic range capability such that even when poorly adjusted by an inexperienced operator there is little chance of failing to detect useful signals.

It is also an object to provide an improved sounder system operable over a wide range of water depths, such as from the order of a few fathoms to the order of several hundred fathoms with consistent results and with cleanly drawn and distinguishable signal traces affording the described high degree of resolution at all depths.

Still another object is to devise such a system which functions consistently even during heavy rolling and pitching of the vessel, assuming, of course, that the sonar beam angle is sufficiently wide to accommodate the changes of attitude.

In accordance with this invention as herein illustratively described by reference to its presently preferred form, the detected echo signals pass through a pulse modifying circuit before application as marking pulses to the recorder stylus. In the preferred modifier circuit illustrated the signal divides into two channels, one of which comprises a high gain limiting type amplifier which abruptly approaches saturation as signal level increases above a predetermined level, thereby converting signals above a predetermined magnitude into squarefront output pulses of substantially uniform amplitude or, if desired, which amplitude increases at a relatively small rate as the amplifier is driven beyond its limiting point. In the other channel, a relatively low gain amplifier responsive to the signal operates in conjunction with a clamping or modulating device connected to the output of the high gain amplifier to cut back or reduce its level in response only to signals above a predetermined amplitude and to a degree which increases with signal amplitude so as to produce a net output level which is within the dynamic (grey scale) range of the recording paper. The output of the low gain amplifier is integrated or delayed in order to defer the clamping action by a period of short but consistent duration so as to permit a relatively intense marking spike to reach the recorder stylus to mark the paper its darkest tone followed immediately by the reduced-amplitude grey scale signal portion. An adjustable source of reference voltage in the clamping device permits varying the tone or intensity of the gray zone portion of recorded signal traces while resistance in the clamp load circuit provides a dynamic range in the operation of the clamp such that clamping by a signal of moderate strength (i.e. from a fish school near the bottom) does not preclude an immediately ensuing very strong signal (i.e. from the bottom) from marking the indicator medium also. Threshold control in the clamp circuit channel and/or relative gain control as between the channels permits establishing sensitivity of the modifier circuit to signal amplitudes above a selected value while signals of lessers amplitude are unmodified. In the preferred circuit a single adjustment (i.e. establishing bias in the clamping stage) coordinates and varies both the degree of modulation or clamping produced (gray scale amplitude) and the signal threshold level above which signals are modified by the modulation or clamping action.

Preferably, also, in a system in which the scanning speed of the recorder stylus may be changed in order to permit altering the system range setting, the delay time in the modifier circuit is made correspondingly adjustable. In this manner duration of the marking pulse spikes (hence the thickness of the bottom trace line) may be optimized for each of lineal speed rates of the stylus.

These and other features, objects and advantages of the invention will become more fully evident from the following description thereof by reference to the accompanying drawings.

FIGURE 3A is a graphic representation approximately depicting the trace images which would be produced on the typical electrically sensitive (carbonized) recording paper used in sonar recorders, by repetitions on succeeding stylus scans of the signals pulses depicted in FIGURE 3.

Figure 1:
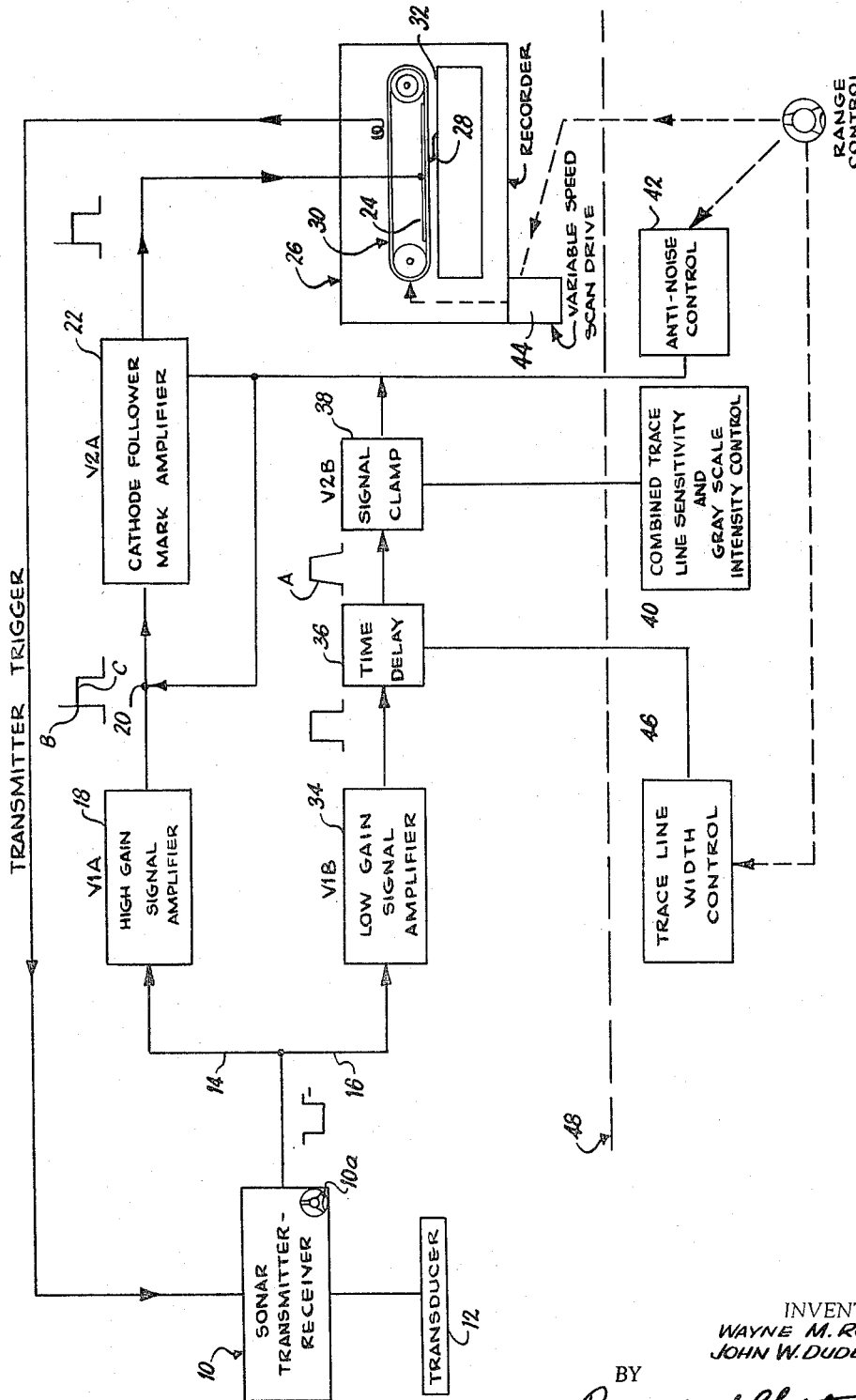
FIGURE 1 is a block diagram of the preferred form of operating circuit and associated sonar transmitter-receiver unit and recorder unit with which it cooperates.

Referring to the drawing, the sonar transmitter-receiver 10 may be of typical or conventional design having a single directional transmitting-receiving transducer 12, such as a barium-titanate disk mounted in fixed positon on the bottom of the vessel. A transducer beam width of between 10 degrees and 20 degrees is representative. The detected output of the sonar receiver preamplifier stages is applied to the pulse modifier circuit which comprises two channels 14 and 16. The first represents the input of a high gain signal squaring amplifier 18. This amplifier is preferably of the type driven to and beyond cut-off by negative input signals greater than predetermined amplitude. The output pulses from amplifier 18 are applied to a controlled junction 20 which leads to the input of a cathode-follower marking amplifier 22 having its output connected to the contact strip or plate 24 of a stylus type recorder 26.

Recorder 26 comprises a stylus 28 mounted on an endless belt 30 to move repeatedly across the width of recording paper 32 which is moved progressively lengthwise in a direction perpendicular to the direction of stylus scan by suitable drive and takeup rolls (not shown) which may be of a conventional nature. The stylus is in electrical contact with the strip or plate 24 while it scans across the recording paper so that any impulses applied to the contact strip 24 are applied between the stylus and a conductive platen of constant (usually ground) potential across which the electrically conductive (carbonized) surface of the recording paper slides in the usual manner. If these impulses are of sufficient amplitude, a dark or virtually black trace mark is produced on the recording paper and if they are of less than a certain amplitude no trace whatsoever is produced. The recording paper has a dynamic range such that while signals above a certain amplitude will produce the darkest or black traces, those of progressively lesser amplitude will produce marks shaded down progressively in their intensity until fading out to the original tone of the paper itself.

In the second channel 16 the signals from sonar-transmitter receiver 10 are applied to a low gain signal amplifier 34. The output pulses from this amplifier are integrated or delayed in a time delay circuit 36 before application to a signal modulator or clamp stage 38. The latter has an output connected to the control junction 20. With signals above a predetermined amplitude applied to the clamp device 38 the latter will suppress or clamp the output pulses produced by high gain amplifier 18 to a degree related to signal amplitude. The time delay device 36 imparts a sloping leading edge at A to the control pulses applied to the signal amplifier, so that the clamping action does not take place immediately even for the strongest output pulses from amplifier 18. Consequently each output pulse produced by the high gain amplifier 18 is permitted to rise to its full amplitude in an initial spike B before the clamping action takes place. Thereafter, depending upon the setting of an adjustable clamp reference voltage resistor (later explained) controlling the signal clamp device 38 the marking pulse from high gain amplifier 18 will be reduced to a signal determined level C which, within the dynamic range of the recording paper, produces the desired halftone or gray scale effect immediately following the sharply defined dark trace produced by the pulse spike B.

As shown in the block diagram, the control system includes a combined trace line sensitivity and gray scale intensity control unit 40 by which the threshold level of the signal clamp 38 and also its clamping proportionality may be adjusted. The circuit further includes an antinoise control 42 adjustable separately or in accordance with the range setting of the recorder established by the adjustable speed of its chart drive unit 44, and also established by gain control 10a of the sonar transmitter-receiver unit 10, so as to produce optimized noise control consistent with maximum overall system gain. Further, the control circuit also includes a trace line width control 46 which is adjustable with changes in range setting of the system and which has the effect of varying the slope A of the output control pulse from low gain amplifier 34 so that at long ranges the slope will be greater than at short ranges. The end purpose of such an adjustment is to optimize the line thickness representing the bottom contour at all ranges (i.e. stylus scan speeds). The broken line 48 separating the units 40, 42 and 46 from the remainder of the control circuit represents the fact that these units are remote from the control circuit. Usually these units are in the pilot house of the vessel and the control circuit itself is part of the sonar transmitter-receiver chassis which is located as near as possible to the transducer 12 in the bottom of the vessel. Long time problems are entailed in the connections between units 40, 42 and 46 with the related portions of the control circuit, involving induction therein of noise and interference signals, and these are dealt with by means described hereinafter in connection with FIGURE 2.

Figure 2:
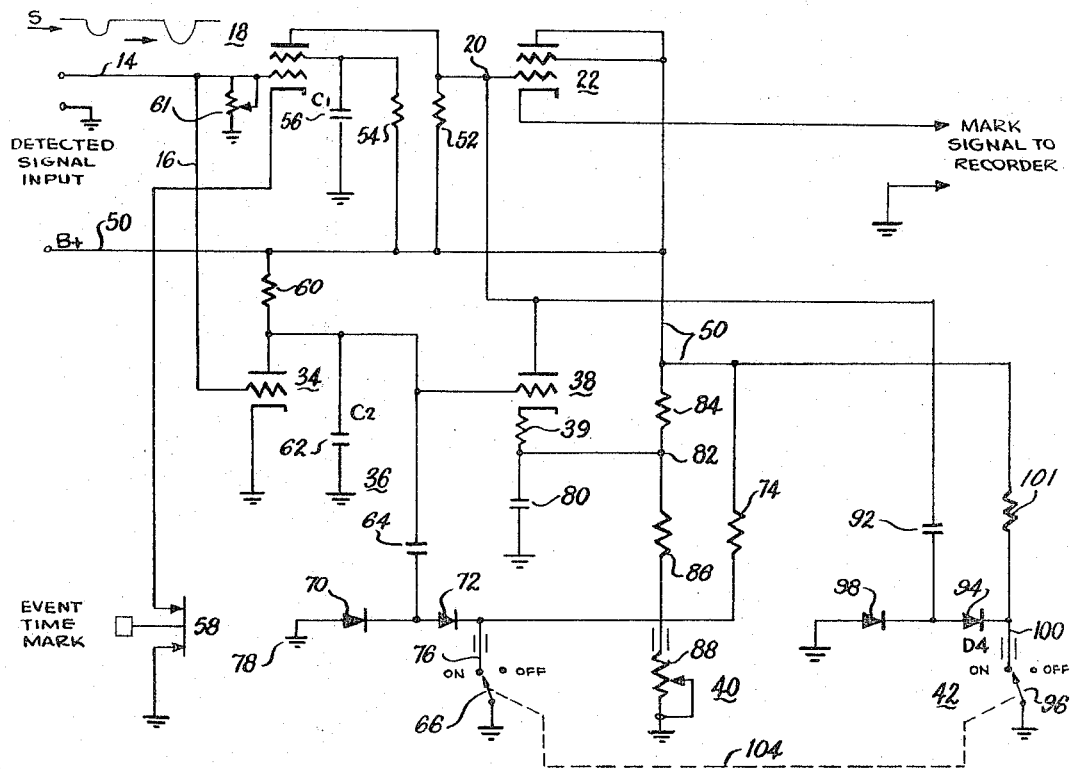
FIGURE 2 is a schematic diagram of the preferred pulse modifier circuit.

In FIGURE 2 the circuit sections are designated generally in accordance with the related blocks in FIGURE 1. In the illustrated circuit, high gain amplifier 18 comprises a tetrode having its control grid connected to the input channel conductor 14, its anode connected to the B+ conductor 50 through a plate load resistance 52, its screen grid connected to conductor 50 through resistance 54 and shunted by a capacitance 56. The cathode of this tetrode is connected to ground through the contacts of a push-button switch 58. Opening of switch 58, interrupting current flow through the tetrode, produces a marking pulse capable of drawing a heavy dark trace on the recording chart 32 for the purpose of designating a particular location on the chart when desired. The tetrode of amplifier 18 is normally conductive but is so biased that negative input signals S of a magnitude greater than a certain minimum level drive the tetrode to and beyond cutoff and thereby produce positive square-front output pulses at the plate thereof (i.e. applied to control junction 20) of substantially uniform magnitude. These marking impulses at control junction 20 are applied to the control grid of a cathode-follower marking amplifier 22. The cathode of this amplifier drives the stylus. Its plate and screen grid are connected to the B+ conductor 50 as shown.

In the channel 16 the negative input signals are applied to the control grid of low gain amplifier 34 which comprises a triode having its plate connected to the B+ conductor 50 through load resistance 60 and its cathode grounded. A potentiometer 61 in the input of one amplifier (18 in the example) permits adjusting the relative gains of the two amplifiers 18 and 34. This will usually be a factory or servicing adjustment made to suit the general conditions for which the system is to be used. The plate of amplifier 34 is coupled directly to the control grid of the triode clamping stage 38, with an integrating condenser 62 shunting these elements to ground as shown. The integrating condenser is part of the time delay unit 36. A second condenser 64 is connected in parallel with the condenser 62 to increase the total capacitance of the integrating circuit when the control switch 66 is in the "on" position. Inasmuch as the signals from amplifier 34 are positive in polarity, the cathode of clamp stage 38 is driven positive by each such signal. The delay circuit, producing the integrating action, further includes the series-connected diodes 70 and 72, the diode 72 being interposed between condenser 64 and switch 66 and the diode 70 being interposed between diode 72 and ground, with such relative polarity that the positive pulses from amplifier 34 are permitted to charge condenser 64 through diode 72 without passing through diode 70 to ground. The junction between diode 72 and switch 66 is connected through large resistance 74 to the B+ conductor 50. Thus, this latter junction is maintained at a positive potential with the switch 66 in the "off" position, thereby applying a threshold bias to diode 72 preventing flow of current into condenser 64 due to positive pulses produced by amplifier 34 in this setting of the switch. However when the switch 66 is set in the "on" position this bias is removed and the capacitance of condenser 64 is permitted to be added to that of condenser 62 in order to increase the time constant of the integrating or delay circuit.

Diode 70 is located in the physical confines of the electrical chassis containing the control circuit as such and is connected to switch 66 through a long cable 76. The function of diode 70 is to prevent noise signals of appreciable amplitude from being picked up by the long cable and being transmitted to the clamping tube 38. In effect, should any negative noise impulses be induced in cable conductor 76 they will be shorted to ground at 78 directly through the serially-connected diodes 70 and 72. On the other hand, should any positive noise impulses be induced in long conductor 76 they are not permitted passage through the diode 72 because of its unilateral conductivity opposed to these pulses. Thus, the line 76 may be as long as desired and the switch 66 may be located at the end of it remote from the control circuit in order to control the time constant of the integrating circuit 36 without injecting undue noise therein.

It will be observed that the cathode of triode 38 is connected to ground through a storage condenser 80 and to the junction point 82 of a voltage divider comprising a resistance 84 connected at one end to the B+ conductor 50 and at its opposite end to the junction 82 and to one end of resistance 86. The latter is connected to ground through the variable resistance 88 comprising the combined trace line sensitivity and gray scale intensity control (FIGURE 1). Condenser 80 assumes a normal charge potential of a value depending upon the setting of resistance 88. This combination is referred to herein as a reference voltage source. The larger this resistance the higher the stored reference potential on condenser 80 and thereby the more negatively the threshold bias applied to clamp tube 38. The higher this negative bias the greater must be the amplitude of the positive signal impulses applied to tube 38 by low gain amplifier 34 in order to operate the clamp or modulator. Noting that resistance 52 is connected in series with tube 38 between B+ conductor 50 and condenser 80 is a voltage divider, once the clamp triode 38 becomes conductive, tube 18 then being substantially cut off, the potential developed at divider junction 20 becomes equal to the reference voltage stored across condenser 80, plus the voltage drop in the tube and in degenerative feedback resistance 39. The stronger the applied signal, the lower the plate resistance of tube 38, and the greater the clamping action; that is the smaller the net potential applied to the control grid of tube 22. Thus, the resultant marking pulse amplitude C (FIGURE 1) produced at the cathode of tube 22, occurring after the spike B is determined in part by the setting of resistance 88 and in part by the signal amplitude at the input of tube 38. Because a single resistance controls both threshold sensitivity level and clamping or modulating action of stage 38, it is evident in the particular case that a high setting for the resistance 88 will require an input signal S of relatively large amplitude to clamp itself back to the gray scale region on the graph paper (after the initial marking spike) and that the tone or intensity of the gray scale marking will be relatively light (i.e. more nearly that of the natural tone of the paper), whereas a low setting of resistance 88 will permit the circuit to clamp in response to even relatively weak signals and there will be less contrast between the intensity of the mark from the spike and the comparatively dark gray scale mark or trace which ensues, depicting the signal.

This latitude or dynamic range of the circuit insures the visible appearance of a strong signal on the recorder even if it so closely follows another signal as to occur within the gray scale region of the latter. Thus a school of fish lying next to the bottom will be distinguishable from the bottom itself. This dynamic range feature is further enhanced by the presence of negative feedback resistor 39 in the cathode of clamp tube 38. It will of course be evident that the signal-determined modulating or clamping action is proportional to signal intensity but that the proportionality is not or need not be linear.

For purposes of anti-noise control, filter condenser 92 is connected between junction point 20 and ground through rectifier 94 and switch 96 when the latter is in the "on" position. Rectifier 98 is connected between ground and the junction between condenser 92 and rectifier 94. The arrangement comprises the same circuit configuration as that employed in the case of condenser 64, rectifier 72 and rectifier 70, and for the same purpose. It eliminates noise and spurious electrical pickup in the long cable conductor 100 extending between the electronic chassis unit in the hold of the vessel and the control panel in the pilot house, in which the switch 96 is mounted. The function and use of switch 96 and condenser 92 will now be explained. In the short range settings of the system (i.e. of the recorder chart drive 44 and of the transceiver gain control 10a) the stylus is caused to travel at a rapid speed across the recording paper and the gain setting is reduced because even the weak signals are of strong intensity. Because the signals are strong in relation to noise, switch 96 is left in the "off" position and condenser 92 is not connected in shunt to the control junction 20. However, at the long range setting of the system noise level is a serious problem, particularly because receiver gain is set at a very high level. Electrical noises originating in and about the vessel then become a problem. Much of this noise may be eliminated without disturbing the signal traces on the recording chart by moving switch 96 to the "on" position in order to connect condenser 92 in shunt to the control junction 20. Because most noise pulses are of much shorter duration than the transmitted pulses (increased for long range operation) noise may be filtered out without also eliminating the desired echo pulse signals. Typically the transmitted pulse length operating a recording sonar system of representative design at a depth range of 50 fathoms will be approximately two hundred microseconds, whereas a typical pulse length for operating at 400 fathoms will be of the order of ten milliseconds. If desired the switches 96 and 66 can be interconnected for conjoint operation as shown by the dashed line 104.

In the short range setting switch 66 is "off," so that the marking spikes B are made of relatively short duration, producing a given trace length on the recording paper at the high speed of the stylus scan. However in the long range setting, the stylus travels slowly across the paper and, in order to produce marks identifying the bottom contour of the same length (measured in percentage of the width of the recording paper) as those produced in the short range setting, switch 66 is in the "on" position in order to produce longer spikes B.

Figure 3:
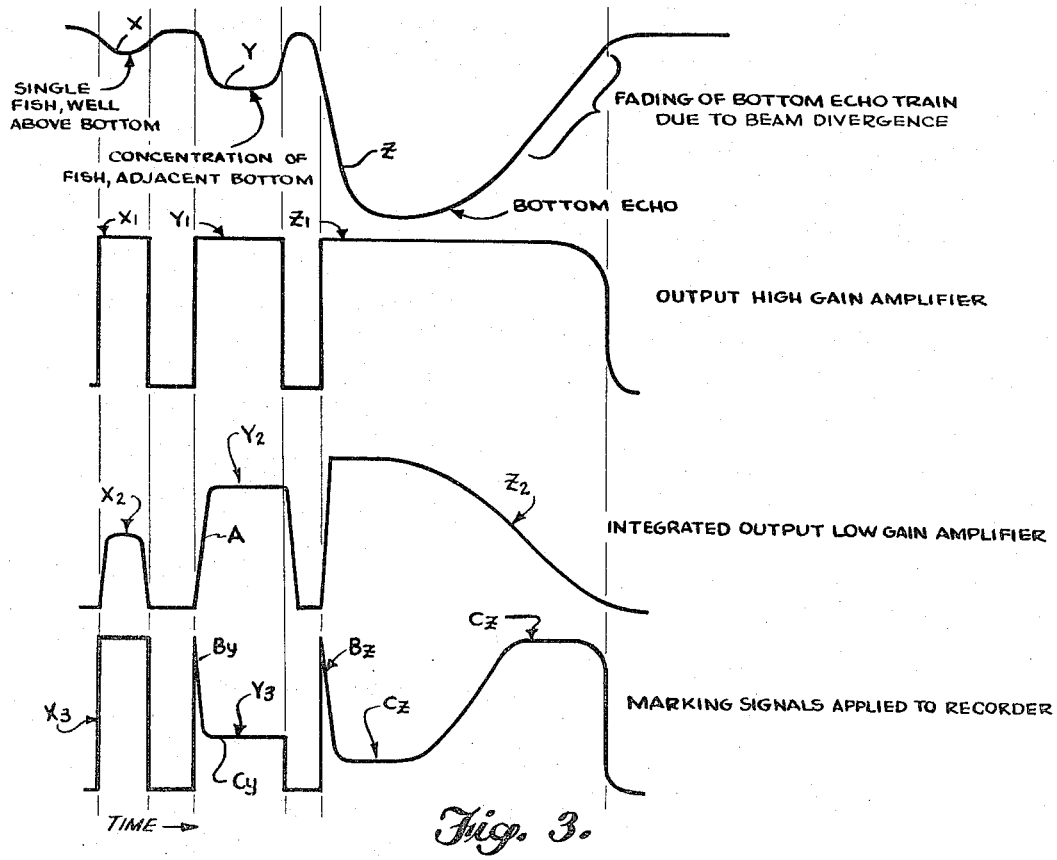
FIGURE 3 is a wave diagram depicting typical signals applied to and derived from the modifier circuit for energizing the recorder stylus.

Referring now to FIGURE 3, there are shown typical pulse wave forms, somewhat simplified as to shape but illustrating the main principles involved in operation of the pulse modifier system. The first pulse X is representative of that produced by a relatively small and slightly reflective target, such as a fish, which produces an echo signal sufficient to be detected and recorded, but not sufficient to be self-clamped or self-suppressed in the control circuit. The corresponding output of the high gain amplifier comprises a pulse of full amplitude, $X_1$. Only a small output $X_2$ is produced by the low gain amplifier and this is insufficient to operate the clamp stage, so that the marking pulse $X_3$ applied to the cathode follower driver is of full amplitude and of a duration corresponding approximately to the duration of original signal pulse X.

The second pulse Y is of longer duration and of greater amplitude and may be representative, for example, of a concentration of fish. It produces a pulse $Y_1$ in the output of the high gain amplifier and a pulse $Y_2$ in the output of the low gain amplifier with a sloping front or leading edge A such as to permit a spike $B_y$ to occur at the junction 20 before the main body of the pulse $Y_2$ clamps the marking pulse down to the level $C_y$ as shown. Thus, the composite pulse $Y_3$ applied to the cathode follower driver consists of an initial spike which produces a dark dot of very short duration on the recording chart, and an ensuing reduced plateau $C_y$, which produces a gray or half-tone effect on the recording chart.

The third pulse Z shown comprises the composite or mass effect of the bottom echo which consists of a continuous train of reflections resulting in a relatively high-amplitude pulse diminishing gradually as the result of progressively weaker reflections returning to the vessel in the increasingly outlying reaches of the divergent sonar beam. The resultant pulse produced by the high gain amplifier, $Z_1$, is sharp at its initiation and tends to trail off at its termination but not as gradually as the original pulse Z because of the relatively sharp cutoff characteristic of the high gain amplifier 18. The output of the low gain amplifier comprises the pulse $Z_2$ which again has a sharp but definitely sloping (delayed) leading edge, produced by the time delay 36, and which has a trailing edge more or less following the slow decay of the original pulse Z. Thus the clamping action from the pulse $Z_2$ produces the sharp initial marking spike $B_z$ which causes a sharply defined black dot on the recording chart, representing the specific bottom location, followed by the reduced-amplitude plateau $C_z$ caused by clamping action of the pulse crest. As the pulse $Z_2$ diminishes the clamping action disappears and the persisting bottom signal train is restored to amplitude in the output of high gain amplifier 18. The marking pulse thus rises to the higher plateau $C_z'$ before it drops back to zero at the end of the bottom echo train.

In FIGURE 3A the effect of the three pulses on a recording chart are depicted. The traces $T_x$ represent the successive traces produced on succeeding cycles of the sonar system with the vessel moving over the object producing the reflection signal X. These are relatively dark traces of a length corresponding to the full width of the original transmitted pulse. The traces $T_y$ represent the traces produced by pulses Y and consist of the initial sharply drawn dots followed by the gray tones characteristic of the plateau region $Y_3$ in its relationship with the dynamic range of sensitivity of the recording paper. The traces $T_z$ in turn depict the characteristic markings produced by a solid bottom and consist of the contour-defining series of short dots of intense tone followed by the light tone or gray scale traces and then by the returning darker line traces which represent the increased plateau $C_z'$. Because of the dynamic range of the clamp stage the gray tones following a strong pulse will be lighter than those following a weak pulse. Thus, if signal Z were to occur before signal Y terminated, while the clamping action from signal Y would still be in effect it would nevertheless be possible to observe the initiation of the stronger bottom signal by noting the change in gray tone produced by the bottom echo. In fact by designing high gain amplifier 18 so that it is not quite cut off fully by a strong fish school echo, the much stronger bottom echo will produce a step increase in the marking pulse and draw a dark dot at the initiation of the bottom echo train Z even though signal Y had not yet ended.

Figure 4:
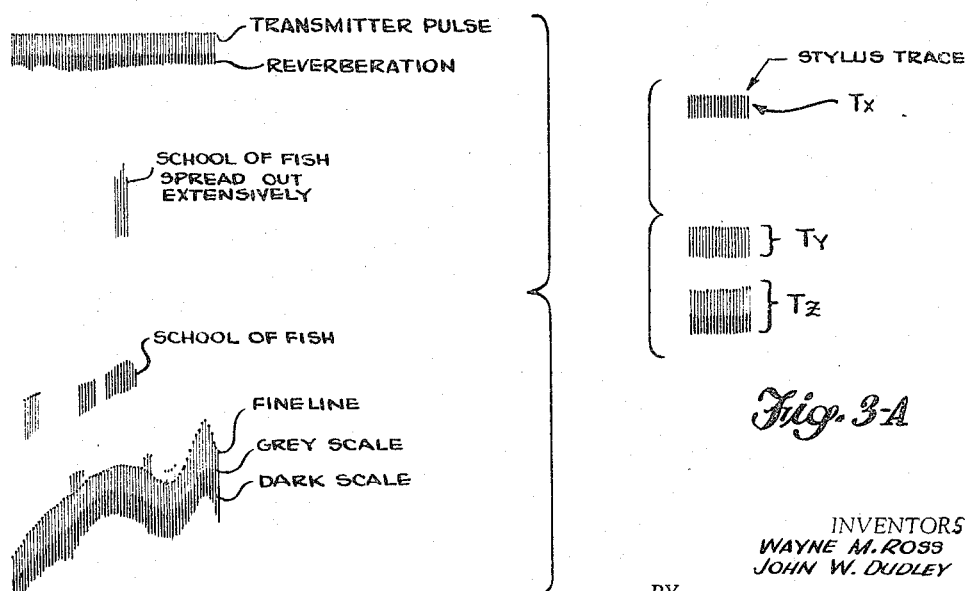
FIGURE 4 is a simplified illustration of a typical section of record drawn on chart paper using the invention during progress of the carrier vessel over a typical bottom region.

In FIGURE 4 there is shown the approximate appearance of a length of recording chart paper operating over a given bottom region to indicate the type of recording produced with a system using this invention. It will be seen that the bottom contour is very sharply defined, is easily detectable and distinguishable from fish and other objects located at or near the bottom and has a realistic pictorial effect which lends itself to reliable and realistic interpretation by the operator. If desired the degree of contrast between the fine line representing bottom contour and the lighter traces representing the gray scale regions may be varied by adjusting the control 40. As previously mentioned this will also adjust the sensitivity threshold of the clamp.

Figure 5:
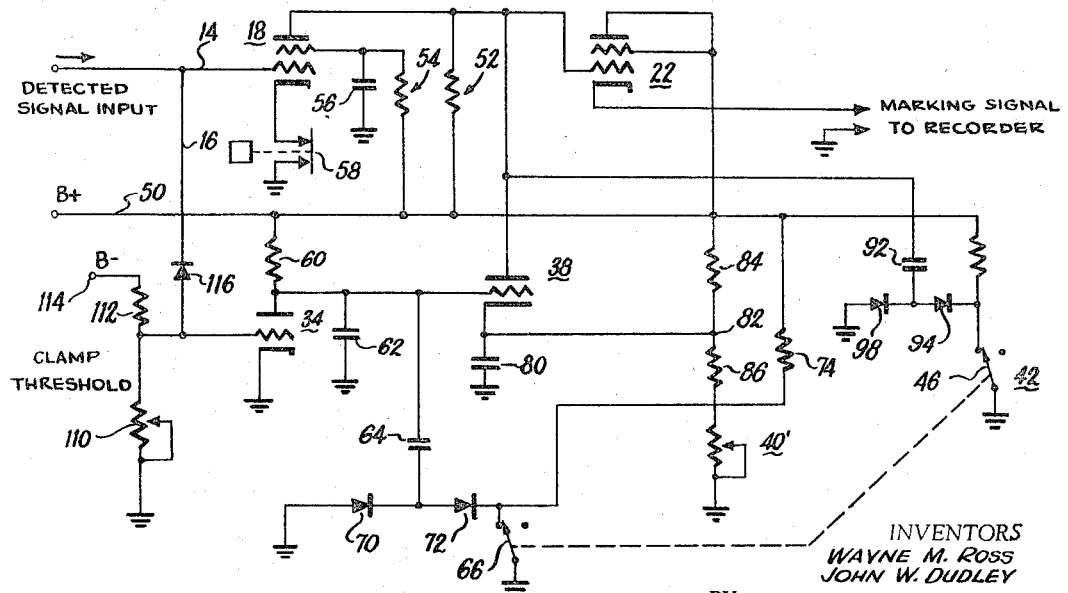
FIGURE 5 is a modified circuit generally similar to that shown in FIGURE 2 but with separate elements for threshold level adjustability and for clamp reference (gray scale) voltage.

If it be desired to adjust the control 40, and thereby the relative intensity of the gray scale traces produced in the case of proportionate self-clamping or self-suppressing strong echo pulses, without simultaneously changing the sensitivity level of the control circuit to signals sufficient to produce a self-clamping action, a separation of functions may be achieved by suitable means such as that depicted in FIGURE 5. In this figure parts corresponding to those shown in FIGURE 2 bear similar reference numerals. In this instance, however, the sensitivity level for self-clamping pulses is established by the amount of negative bias applied to the grid of low gain amplifier 34. Such bias is derived from a voltage divider including variable resistance 110 connected serially with a fixed resistance 112 between ground and a negative voltage supply terminal 114. A rectifier 116 interposed in the channel conductor 16 permits only negative signals of an amplitude exceeding the bias level at the input of amplifier 34 from reaching the amplifier and being amplified for purposes of operating the clamp stage 38. This level is adjusted by means of resistor 110.

These and other aspects of the invention will be evident to those skilled in the art by reference to the illustration and description of the preferred form as presented herein.

We claim as our invention:

1. In pulse echo sounding wherein an electrically energizable recording stylus is scanned cyclically, in synchronism with periodic sounding pulses, across an electrically sensitive recording medium having a dynamic range of visible marking intensities related to amplitudes of electrical marking pulses applied to the stylus, the method of producing distinctive identifying markings on the medium representative of the bottom and objects at varying distances above bottom, comprising reshaping received individual echo pulses of an amplitude above a predetermined level for application to the stylus, including amplifying the leading portions of the individual pulses to a relatively high amplitude level capable of substantially maximum marking intensity on the medium, and amplifying the immediately succeeding following portions of the respective pulses to a lesser amplitude level generally inversely proportional to echo pulse amplitude capable of producing a visible marking on the recording medium of a lower marking intensity contrasting with that produced by the leading front portions.

2. The method defined in claim 1, wherein the pulse leading portions are limited at substantially the same amplitudes for echo pulses of varying amplitudes.

3. In a pulse echo type sounder system including a periodically pulse-operated transmitter and associated echo pulse receiver and a synchronously scanned recording indicator having a recording medium with a dynamic range of visibly distinguishable graduations of marking intensities, means in the receiver for generating marking pulses from received echo signal pulses of variable amplitude comprising a first amplifier means having an input connected to receive such variable-amplitude signal pulses and operable to produce therefrom output marking pulses of more nearly constant amplitude capable of marking the recording medium with substantially maximum intensity in response to received signal pulses above predetermined amplitude, and clamp means having an input connected to be responsive to such variable-amplitude signal pulses and having an output connected with the first amplifier means and operable thereby during and in response to such signal pulses to reduce the amplitude of said respective output marking pulses generally proportionately to signal pulse amplitude within the dynamic marking range of said recording medium.

4. The combination defined in claim 3, and means in the receiver delaying such clamp means output in relation to the signal pulses by a small fraction of the transmitted pulse length, whereby the resultant marking pulses include an initial spike of substantially maximum recording intensity followed by a plateau of lesser recording intensity within the dynamic marking range of the recording medium.

5. The combination defined in claim 4, further comprising means connected with the recording indicator to vary the scanning speed thereof, and wherein the means in the receiver delaying the clamp means output includes means to vary the delay in such output, whereby the duration of the leading portions of said output pulses may be changed as recording range is changed.

6. The combination defined in claim 4, including means by which the clamp means is biased to a threshold level preventing occurrence of such amplitude-reducing clamp means output in response to signal pulses below a selected threshold amplitude, and means to adjustively vary such bias and thereby the pulse threshold amplitude.

7. The combination defined in claim 6, wherein the means producing such threshold bias is connected with the clamp means in such manner as to effect a reduction of clamp means output for a given signal level when the bias is increased.

8. The combination defined in claim 3, wherein the clamp means comprises a second amplifier having a load impedance and the first amplifier has a load circuit also including said load impedance, and means to threshold bias the second amplifier to prevent occurrence of such amplitude-reducing output of the clamp means from signals below selected amplitude, said bias means including an adjustable reference voltage source connected serially with said second amplifier, thereby to vary its bias, and simultaneously its output level for a given signal pulse level.

9. The combination defined in claim 8, and degenerative feedback means in the second amplifier extending its dynamic response range to signal pulse amplitude variations.

10. In a pulse echo type sounder system including a periodically pulse-operated transmitter and associated echo pulse receiver and a synchronously scanned recording indicator having a recording medium with a dynamic range of visibly distinguishable graduations of marking intensities, means in the receiver for generating marking pulses from received echo signal pulses of variable amplitude comprising means to convert the variable amplitude signal pulses into marking pulses of more nearly constant amplitude at least substantially equalling the recording medium maximum marking pulse intensity, and means also responsive to the signal pulses for reducing the amplitude of the marking pulses by amounts generally proportional to the respective signal pulse amplitudes after expiration of an initial fractional portion of the lengths of such marking pulses, whereby the pulse markings include an initial intense mark followed by a lighter mark of an intensity which varies inversely with signal pulse amplitude.

11. In a pulse-echo system having a pulse-echo receiver and a display means therein for indicating received signals of different orders of magnitude, means to enhance the indications of received signals of a selected general order of magnitude in preference to signals of a different order of magnitude, including amplifier means operable to limit the magnitude of received signals before application thereof to said display means, and clamping circuit means operable in response to received signals to decrease the magnitude of such limited signals by amounts which increase with increase of received signal strength, said clamping circuit means including means adjustable at will therein to vary its gain and simultaneously to vary its threshold level of response to received signals, whereby such gain is increased as threshold level is decreased.

References Cited by the Examiner

UNITED STATES PATENTS

| | | | |
|---|---|---|---|
| 2,685,039 | 7/1954 | Scarbrough et al. | 307—88 |
| 2,897,359 | 7/1959 | Raymond et al. | 328—70 |
| 3,072,882 | 1/1963 | Beebe | 340—3 |
| 3,094,681 | 6/1963 | Kietz et al. | 340—3 |
| 3,098,210 | 7/1963 | Sparling et al. | 340—3 |
| 3,109,154 | 10/1963 | Grada et al. | 340—3 |

CHESTER L. JUSTUS, *Primary Examiner.*

LEWIS H. MYERS, *Examiner.*

R. A. FARLEY, *Assistant Examiner.*